March 19, 1935. A. E. DRISSNER 1,995,116
STARTER SPRING AND METHOD OF MAKING SAME
Filed Aug. 30, 1932
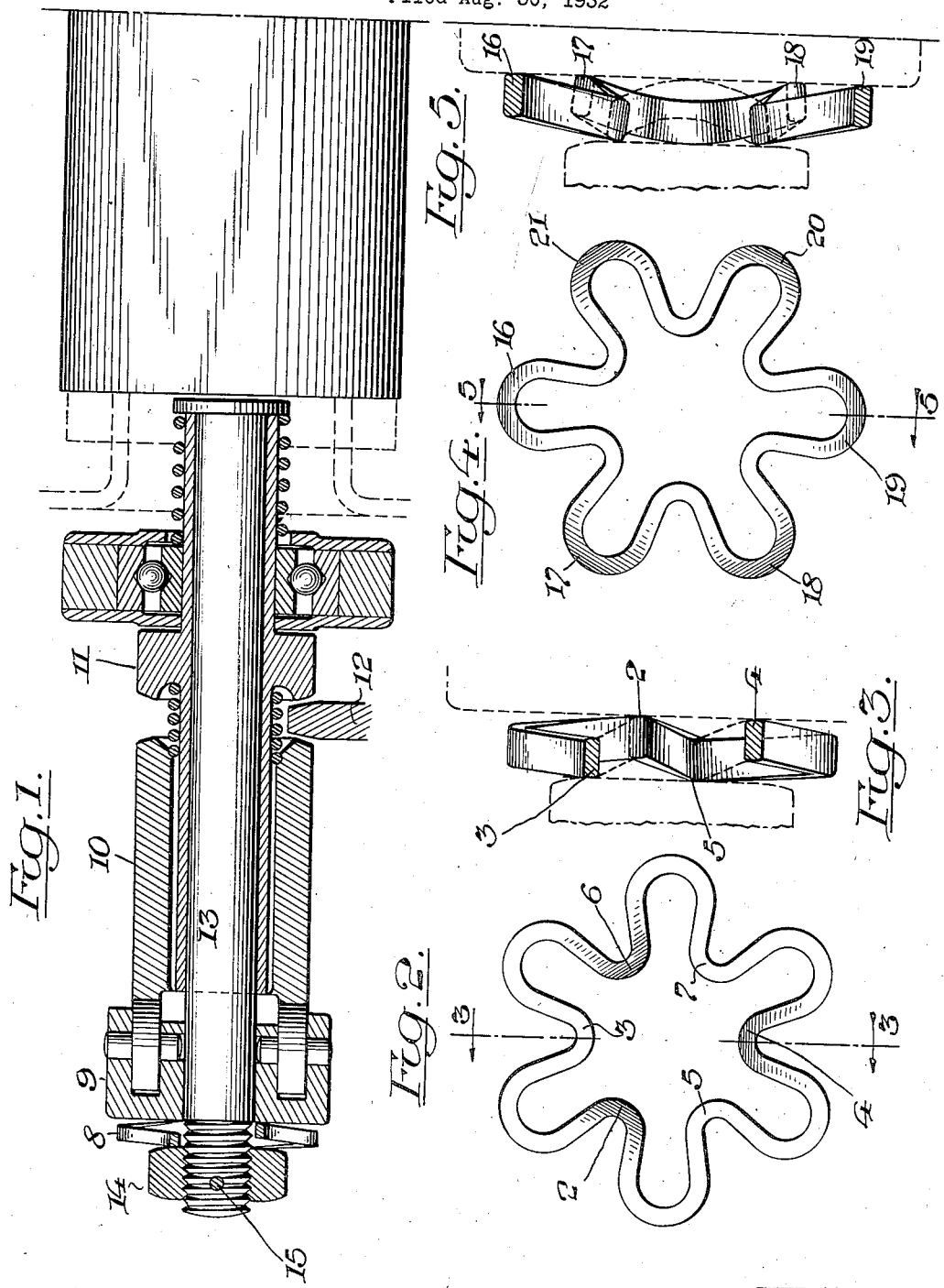
INVENTOR
A. E. Drissner
BY
ATTORNEY Patented Mar. 19, 1935

1,995,116

UNITED STATES PATENT OFFICE 1,995,116

STARTER SPRING AND METHOD OF MAKING SAME

Alfred E. Drissner, Cleveland, Ohio, assignor to The National Acme Company, Cleveland, Ohio, a corporation of Ohio Application August 30, 1932, Serial No. 631,065

8 Claims. (Cl. 29—173)

This invention relates to springs and more particularly to springs for use with automobile engine starters or other devices where a spring of high tension is desired, the object of the invention being to provide an improved spring and method of making the same, simple in construction, efficient in use, inexpensive to manufacture and capable of use in a small space.

A further object of the invention is the provision of a spring which is extremely strong and durable having a high degree of tension and which, by reason of its construction, may be used where the space is limited with very little loss of friction.

In the drawing accompanying and forming a part of this specification, Fig. 1 is a sectional view illustrating the spring applied to an engine starter assembly.

Fig. 2 is a plan view of this improved starter spring.

Fig. 3 is a sectional view of Fig. 2 taken on line 3—3 looking in the direction of the arrows with an adjoining part of the starter assembly shown in dotted lines.

Fig. 4 is a modified form of Fig. 2, and

Fig. 5 is a sectional view of Fig. 4 taken on line 5—5 looking in the direction of the arrows.

Similar characters of reference indicate corresponding parts in the several views.

Before explaining in detail the present improvement and mode of operation thereof, I desire to have it understood that the invention is not limited to the details of construction and arrangement of parts illustrated in the accompanying drawing since the invention is capable of other embodiments, and that the phraseology which I employ is for the purpose of description and not of limitation.

Where an exceptionally high tension and small friction loss is desired, the spring is made in the manner shown in Figs. 2 and 3, but where the degree of friction loss is not so important, although a high tension is desired, it is made in the manner shown in Figs. 4 and 5.

The spring of any suitable material such as spring steel is constructed from a single strip of material, first forming a ring considerably larger than the desired spring circumference and having a greater depth or thickness axially of the spring than transversely thereof, whereby it has greater strength depthwise than crosswise, and, therefore, more effectively controls the load to be carried, thus preventing the breakage of the spring under that load; and then bending the outer diameter into successive hair-pin form to form untwisted unwarped loops, thus giving a foreshortened star with curved apices and, in the forms shown, these apices lie on two distinct circumferences although this may be varied if desired.

In the form shown in Figs. 2 and 3, the inner apices, which may be of any desired number according to the tension and the space afforded for the use of the spring, are bent alternately sidewise in opposite directions and are thus staggered. In the form illustrated there are six inner apices which are indicated by the numerals 2, 3, 4, 5, 6 and 7, and the apices indicated by the even numerals are bent in one direction while those indicated by the odd numerals are bent in the opposite direction and thus the outer apices formed with a twist.

With this construction, the outer apices of the spring will be midway between the contact points while the inner points of the apices will bear upon the adjacent parts of the assembly with the result that the number of bearing surfaces on each contacting side of the spring will be equal to one-half the number of inner apices of the spring which, of course, tends to reduce to a minimum the friction loss.

In the assembly shown in Fig. 1, the spring is indicated as 8 and it will be seen that this spring 8 serves as a combination cushion for the roller holder 9 and an automatic wear compensator for the cam 10, the cone 11 and the flywheel 12. The roller holder 9 is free to slide on the armature shaft 13 and compresses the spring 8 against the nut 14, thereby absorbing the sudden shock developed when the cam 10 and cone 11 contact with the flywheel 12 when the starter is in motion. The nut 14 is screwed onto the threaded end of the armature shaft 13 and is held in place thereon by means of a cotter pin 15 and this nut 14 may be adjusted according to the proper cushion and wear compensation requirements.

In the form shown in Figs. 4 and 5, the shape is the same but the inner apices 16, 17, 18, 19, 20 and 21 are all bent in the same direction and so form a concave or saucer-shaped spring and, although forming a strong spring, in view of the greater number of bearing points, the friction loss during its compression is somewhat greater since, in this form of spring the number of bearing points on each contacting member of the assembly is equal to the number of inner apices as all the inner apices bear on one contacting member of the assembly and all the outer apices bear on the other contacting member of the assembly so that this increased number of bearing points increases the amount of friction loss of the spring.

Thus it will be seen that I have provided a spring which may be used in connection with an automobile or other engine starter or with any other device where it may be advantageously employed and where the space is limited while at the same time a high degree of tension is obtained.

When this improved spring is used with an engine starter, it is compressed when the starter is in operation and thus creates a satisfactory cushion to eliminate sudden shock which would prove detrimental to the mechanism.

It is to be understood that by describing in detail herein any particular form, structure or arrangement, it is not intended to limit the invention beyond the terms of the several claims or the requirements of the prior art.

Having thus explained the nature of my said invention and described a way of constructing and using the same, although without attempting to set forth all of the forms in which it may be made or all of the modes of its use, I claim:

1. A high tension spring for absorbing shocks in automobile starters constructed to reduce friction to a minimum and having the same uniform cross section throughout comprising a series of inner and outer untwisted unwarped curved loops formed from a single circular strip and having a series of loops projecting laterally relative to other loops whereby the spring is adapted to engage only at its looped ends, thereby providing a minimum of contact surface, said loops having materially greater depth axially of the spring than transversely thereof whereby there is greater strength depthwise than crosswise to prevent breakage of the spring under the load and whereby it more effectively controls the load that can be carried.

2. A high tension spring for absorbing shock in automobile starters and constructed to reduce friction to a minimum and having the same uniform cross section throughout comprising a series of inner and outer untwisted unwarped curved loops formed from a single circular strip with the loops staggered in opposite directions whereby the spring is adapted to engage only at its looped ends thereby providing a minimum of contact surface, said loops having materially greater depth axially of the spring than transversely thereof whereby there is greater strength depthwise than crosswise to prevent breakage of the spring under the load and whereby it more effectively controls the load that can be carried.

3. A high tension spring for absorbing shocks in automobile starters constructed to reduce friction to a minimum and having the same uniform cross section throughout comprising a series of inner and outer untwisted unwarped curved loops formed from a single circular strip and having the inner loops staggered alternately in opposite directions whereby the spring is adapted to engage only at its looped ends thereby providing a minimum of contact surface, said loops having materially greater depth axially of the spring than transversely thereof, whereby there is greater strength depthwise than crosswise to prevent breakage of the spring under the load and whereby it more effectively controls the load that can be carried.

4. A high tension spring for absorbing shocks in automobile starters constructed to reduce friction to a minimum and having the same uniform cross section throughout comprising a series of inner and outer untwisted unwarped curved loops formed from a single circular strip, the inner loops staggered alternately in opposite directions whereby the spring is adapted to engage only at its looped ends thereby providing a minimum of contact surface, each series of outer loops and each series of inner loops being uniformly curved with the curvature of the outer loops greater than the curvature of the inner loops, said loops having materially greater depth axially of the spring than transversely thereof whereby there is greater strength depthwise than crosswise to prevent breakage of the spring under the load and whereby it more effectively controls the load that can be carried.

5. The method of making a high tension spring for absorbing shocks in automobile starters constructed to reduce friction to a minimum and having the same uniform cross section throughout comprising a series of inner and outer untwisted unwarped curved loops which consists in bending a single flat strip of material into circular form and having a circumference larger than the circumference of the ultimate spring, then weaving the circular strip in and out to form a series of inner and outer curved loops and then bending a series of loops to project laterally of other loops whereby the spring is adapted to engage only at its looped ends thereby to provide a minimum of contact surface, said loops having materially greater depth axially of the spring than transversely thereof whereby there is greater strength depthwise than crosswise to prevent breakage of the spring under the load and whereby it more effectively controls the load that can be carried.

6. The method of making a high tension spring for absorbing shocks in automobile starters constructed to reduce friction to a minimum and having the same uniform cross section throughout comprising a series of inner and outer untwisted unwarped curved loops which consists in bending a single flat strip of material into circular formation having a circumference larger than the circumference of the ultimate spring, then weaving the strip in and out to form a series of inner and outer curved loops, and then bending the inner loops to project laterally of the outer loops in opposite directions whereby the spring is adapted to engage only at its looped ends thereby providing a minimum of contact surface, said loops having materially greater depth axially of the spring than transversely thereof whereby there is greater strength depthwise than crosswise to prevent breakage of the spring under the load and whereby it more effectively controls the load that can be carried.

7. The method of making a high tension spring for absorbing shocks in automobile starters constructed to reduce friction to a minimum and having the same uniform cross section throughout comprising a series of inner and outer untwisted unwarped curved loops which consist in bending a single flat strip of material into circular formation having a circumference larger than the circumference of the ultimate spring, then weaving the circular strip in and out to form a series of inner and outer curved loops and then bending the inner loops to project laterally of the outer loops alternately in opposite directions whereby the spring is adapted to engage only at its looped ends, thereby providing a minimum of contact surface, said loops having materially greater depth axially of the spring than transversely thereof whereby there is greater strength depthwise than crosswise to prevent breakage of the spring under the load and whereby it more effectively controls the load that can be carried.

8. The method of making a high tension spring for absorbing shocks in automobile starters constructed to reduce friction to a minimum and having the same uniform cross section throughout comprising a series of inner and outer untwisted unwarped curved loops which consists in bending a single flat strip of material into circular formation having a circumference larger than the circumference of the ultimate spring, then weaving the circular strip in and out to form a series of inner and outer curved loops, then bending the inner loops to project laterally of the outer loops whereby the spring is adapted to engage only at its looped ends, thereby providing a minimum of contact surface, said series of inner and outer loops having a uniform curvature, the curvature of the outer loops being greater than that of the inner loops, said loops having materially greater depth axially of the spring than transversely thereof whereby there is greater strength depthwise than crosswise to prevent breakage of the spring under the load and whereby it more effectively controls the load that can be carried.

ALFRED E. DRISSNER.